Y2587 OR 3,761,683

United States

Rogers

X 64501
X 64145

[11] 3,761,683

[45] Sept. 25, 1973

[54] SECURITY SYSTEM

[76] Inventor: Steven A. Rogers, 1426 Crowell Rd., Vienna, Va. 22180

[22] Filed: Nov. 8, 1971

[21] Appl. No.: 196,319

[52] U.S. Cl. ......... 235/61.7 B, 221/2, 235/61.12 N, 235/61.11 R, 340/149 A

[51] Int. Cl. ...... G07f 7/02, G06k 7/08, G06k 7/14, G06k 19/08

[58] Field of Search ........................ 340/149 A, 152; 235/61.7 B, 61.6 R, 61.12 N, 61.12 M, 61.11 D, 61.12 C, 61.11 R; 70/277; 40/2.2; 174/68.5; 346/42; 221/2

[56] References Cited

UNITED STATES PATENTS

| | | | |
|---|---|---|---|
| 3,401,830 | 9/1968 | Mathews | 221/2 |
| 3,513,298 | 5/1970 | Riddle | 235/61.11 D |
| 3,512,130 | 5/1970 | Hulett | 340/149 A |
| 3,457,391 | 7/1969 | Yamamoto | 235/61.6 R |
| 3,015,087 | 12/1961 | O'Gorman | 340/149 A |
| 3,559,175 | 1/1971 | Pomeroy | 340/152 |
| 3,419,881 | 12/1968 | Yamamoto | 346/42 |
| 3,444,517 | 5/1969 | Rabinow | 340/146.3 |
| 3,287,839 | 11/1966 | Rotwein | 40/2.2 |
| 3,399,473 | 9/1968 | Jaffe | 40/2.2 |
| 3,234,629 | 2/1966 | Wheeler | 174/68.5 |

*Primary Examiner*—Maynard R. Wilbur
*Assistant Examiner*—Robert M. Kilgore
*Attorney*—John E. Benoit

[57] ABSTRACT

This invention concerns a pass-key system. It contains a method for reading optical and magnetic data from a small card. The optical data is used to microprogram logic circuitry which manipulates the magnetic information. The said magnetic information consists of a binary code. This code is entered into a shift register by manually pushing the card into its counterpart slot. The code is compared by suitable logic to a similar number stored within a memory either of a counter or random access type. If the codes do or do not compare, provision is made to so indicate. If they do match, then the device is enabled to generate a new random combination, store it and write it on the card as the card is withdrawn from the device.

The optical data is provided on several fixed tracks to control the logic, to provide a location bit and to provide the individual card's memory location if there is more than one user.

8 Claims, 4 Drawing Figures

SECURITY SYSTEM

This application relates generally to security systems and more particularly to a security system which uses as a key a flat card having embossed thereon at least one magnetic track and which may include photocell tracks.

Systems have been devised for security purposes as well as for analysis of information using cards which may be carried within a wallet or the like. Such systems normally use either a photo detecting system together with optical tracks on the card or a magnetic detecting device which is used with a magnetic track on the card.

Such systems in the past use a stored memory device which is used to match with a particular card. In such a case the cards are usually similar and therefore are subject to loss and possible duplication. Even in systems wherein a larger memory storage device is used and the cards are individually identifiable, such cards are still subject to loss and/or duplication.

Accordingly, it is an object of this invention to provide a card usable together with an identifying system wherein the code on the card changes each time the card is used.

A further object of this invention is to provide a system using a card as a key wherein the card and a detecting device are so designed that the card must be passed through an alarm enable position before the security actuate position is reached.

A further object of the invention is to provide a coded card having a serial digital code input whereby any tampering with the reader device would not effect the ultimate mechanism or device which is to be used.

Yet another object of the present invention is to provide a system which may include both photocell detection and magnetic detection on one card with simplified circuitry for reading same.

These and other objects of the invention will become apparent from the following description when taken in conjunction with the drawings wherein, FIG. 1 illustrates a basic showing of a card which may be used with the present invention together with the diagrammatic disclosure of the reader used;

Broadly speaking, the present invention discloses an information retrieval system such as a key system which comprises a means for reading data from a small hand-carried card. The data is carried by at least one magnetic track embossed on said card and may include optical tracks which are also embossed on the card. The optical data, when present, is used to micro program logic circuitry which then manipulates the magnetic information. This magnetic information consists of a binary code which is entered into a shift register by manually pushing the card into a slot in an associated reader. The code on the card is compared by a suitable logic to a similar number stored within a memory which may either be of a counter or random access type. If the codes do not compare then an alarm or similar device is sounded. If the codes do match properly, then the device is enabled and a new random combination is generated and stored in the memory and at the same time the magnetic code on the card is changed as it is withdrawn from the device. This code and the new code stored in the memory device match so that the card when used again will actuate the system properly. The optical data may be provided on several fixed tracks to control the logic, to provide a location and to provide the individual cards memory location if there is more than one set in use.

Figures 1, 2:
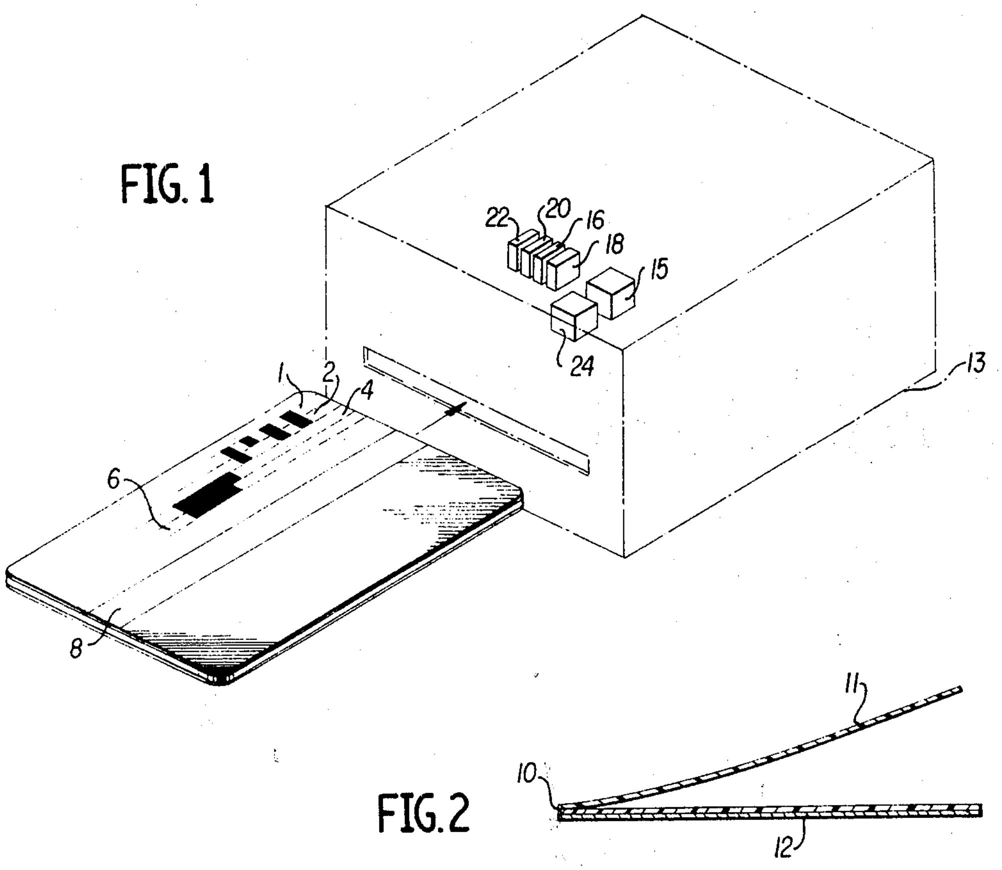
FIG. 2 is a side view of one preferred type of card.

Turing now more specifically to the drawings, there is shown in FIG. 1 a card which may be made of any suitable dielectric material. The card has embossed thereon four optical tracks, 1, 2, 4 and 6 and one magnetic track 8. The optical tracks comprise a clock pulse track 1 which provides code and location information. The user number is coded permenantly on optical track 2. In the specific embodiment shown in the subsequent discussion it is to be understood that the dark areas are equivalent to a "1" state. The strobe track 4 contains the information to provide a command to compare the stored information against that which is being entered by the magnetic track 8. Reset track 6 provides the command to ready the system to rewrite the card as it is being withdrawn.

Also shown in FIG. 1 schematically is a reader including an enclosure 13 and the associated photocell and magnetic devices which will be explained in detail as the description proceeds.

FIG. 2 is a side view of one card which may be used in the present device. As shown there is a metallized plastic film 11 fixed at one end by a suitable adhesive or the like. This film's metallic content is of a non-magnetic nature so as to provide shielding from undesirable magnetic fields. Further, the bottom surface of the card is also so coated for the same purpose. When the key card is inserted into the reader 13, the film 11 curls away from the card so as to provide access to the optical and magnetic tracks thereon. Additionally, film 11 also acts as a mnemonic aid to prevent the card from being inserted upsidedown or backwards.

Figure 3:
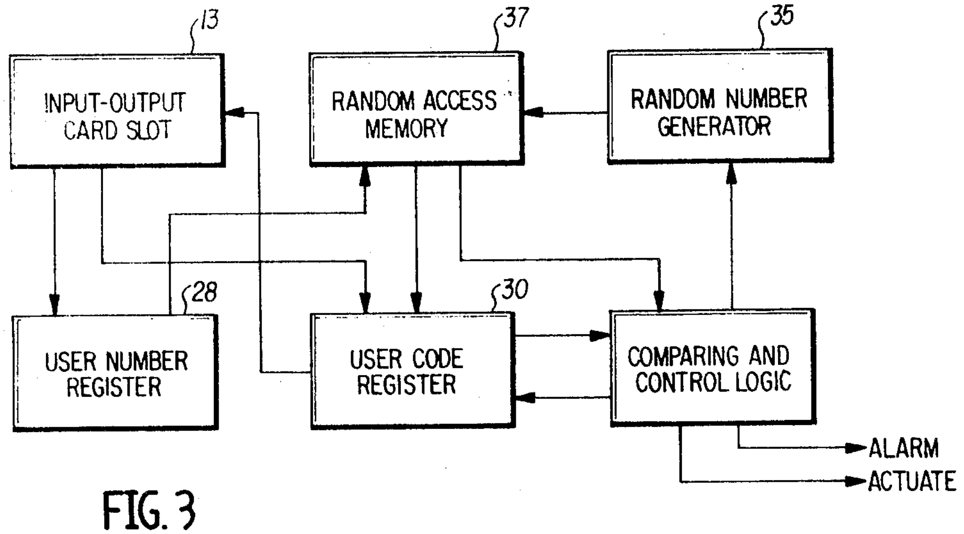
FIG. 3 is a diagrammatic representation of the associated part of the system.

As shown both in FIG. 1 generally and FIG. 3 more specifically, the read write apparatus 13 consists of four optical reading devices 16, 18, 20 and 22 which, in effect, mate with the optical tracks as coded on the card.

Figure 4:
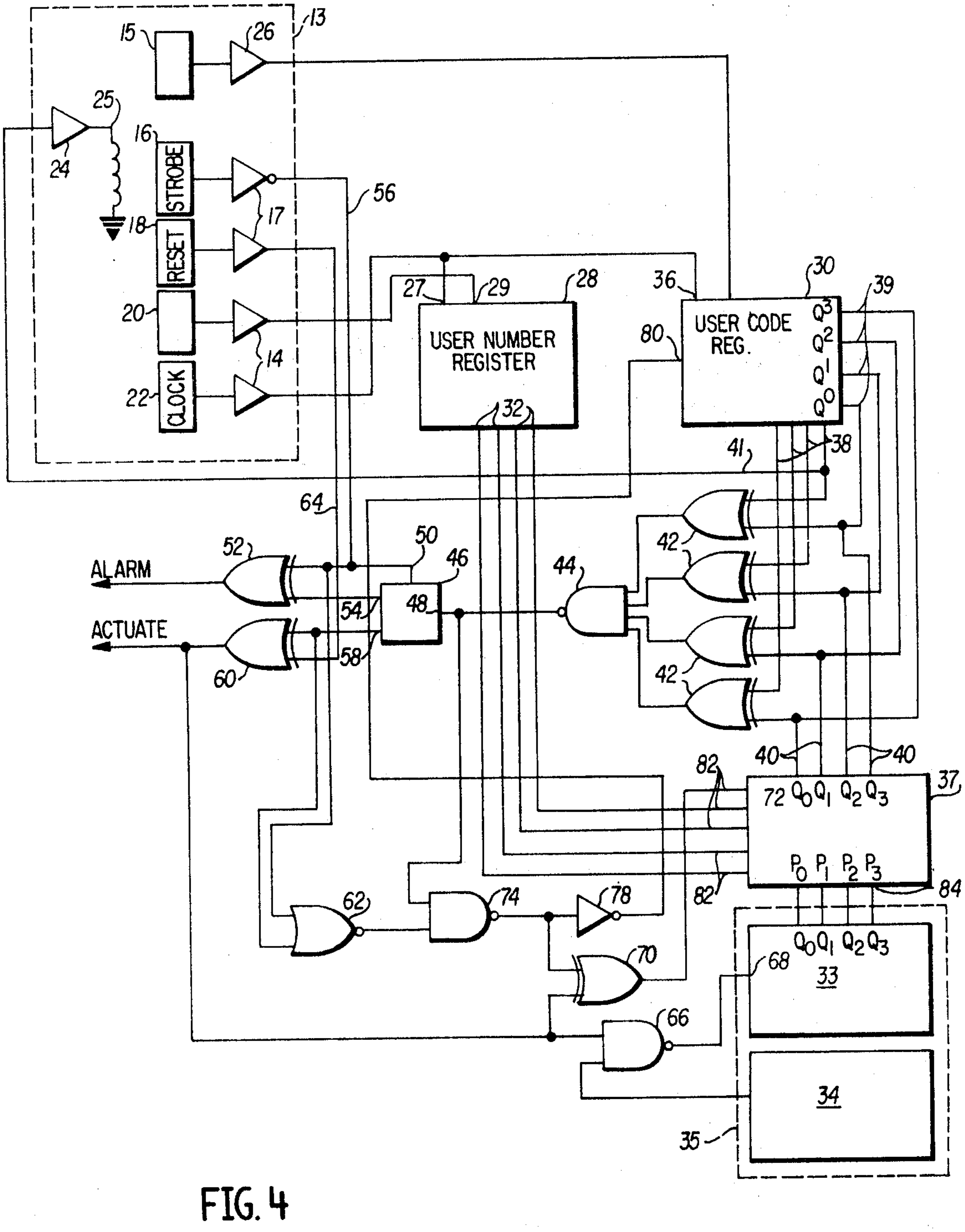
FIG. 4 is a schematic of one specific embodiment of the present invention.

In FIG. 4 the clock input photocell 22 and the user number input photocell 20 both go to a "1" state upon receiving a "1" command from the card from tracks 1 and 2 of the card. Such commands being derived through the use of a well-known pulse shaping circuit 14. The strobe input cell 16 and the reset input photocell 18 and their associated pulse shaping circuits 17 go to a "0" output upon receiving a "1" input from the tracks 4 and 6 on the card.

The remaining components within the reader 13 include a Hall-effect magnetic input 15 so constructed as to provide in conjunction with a pulse forming network 26 a "1" level output for a positive magnetic field and a "0" level output for a negative field as the magnetic track passes thereunder. The positive and negative magnetic fields are provided from the card then as it is inserted, positive and negative indicating field orientation.

A magnetic write head 24 and the indicated pulse forming circuit 25, produces positive magnetic fields on the card when it receives a "1" and it produces a negative field when it receives a "0" from the control logic. This occurs after the card has been used for actuation of the device and is being withdrawn so as to have a new coded magnetic track thereon. This component is shown schematically and it is understood that it includes means for erasing previously coded information on the magnetic track prior to writing a new code thereon.

It should be noted that for purposes of the present disclosure, a four bit format is used both in the user number and user code. However, it is to be understood that the number is not significant to the principal of operation.

The clock reader 22 output is applied via input 27, to the user number shift register 28. Shift register 28 is capable of storing four bits. At the same time the user number reader 20 output is connected to the user number shift register data input 29. The result of these two inputs is the shift of the user number into the register 28 as the card is inserted into reader 13 with the four bit code then appearing in parallel across the shift register output 32.

The clock reader 22 is also connected to the user code shift register 30 through input 36. The data input to the user code register 30 is provided by the Hall-effect pulse forming circuit 26. The result of these two inputs is to shift the user code of the card into the user code shift register 30 as the card is inserted into the card reader 13.

After all the above data is entered, the strobe command from strobe 16 is received at gates 52 and 62 and the pre-stored data with the newly entered data is then compared.

The address code to the random access memory 37 is provided by the outputs 32 from the user number register 28. The outputs 38 from the user code shift register 30 and the outputs 40 from the random access memory 37 are compared in parallel through four exclusive "or" circuits 42, one being provided for each pair of bits. Each output of the four exclusive "or" circuits is applied to a separate input of a four input nand gate 44. The output of gate 44 will only go to a "0" state if all four input bits from the user code register 30 and the random access memory 37 properly concur driving each exclusive "or" gates 42 output to a "1" state. The output of nand gate 44 is connected to the data input 48 of a latch 46. The output of strobe 16 and its pulse forming network is connected to the latch 46 by means of input 50. When the strobe command "1" is encountered, the strobe line is inverted by the pulse forming circuit 17 and the current data state of latch 46 is locked into place. The $\bar{Q}$ output 54 of latch 46 is connected to the alarm output nor gate 52. Gate 52 is only in a "1" output state when the $\bar{Q}$ latch output 54 and the strobe line input 56 are both in a "0" condition.

The Q output 58 of the latch 46 is connected to the actuate output nor gate 60. The Q output 58 is also connected to a nor gate 62. One input of the actuate nor gate 60 is connected to a reset control line 64. Control line 64 goes to a "0" state from a "1" state by command from the card, as supplied by the reset track 18 thereon. The output of nor gate 60 may be connected to any suitable device which the user wishes to be controlled such as a door lock mechanism.

The output of nor gate 60 is also connected to random number gate control 66. Output of control gate 66 is connected to the clock input 68 of a four bit ripple-carry counter 33. The other input to nand gate 66 is connected to the output of a high frequency oscillator 34. Thus, since the actuation output pulse width from gate 60 is determined by the user and since the oscillator causes the counter to count through many times in a very short period, a random number is generated when the actuate output "1" level is present.

The output of nor gate 60 is also connected to an exclusive "or" gate 70. The output of exclusive "or" gate 70 is connected to the present input 72 of the memory. The output of nor gate 62 is connected to the input of a two input nand gate 74. Nand gate 74 is provided with the other input from the output of the code comparison level nand gate 44. The output of nand gate 74 is connected through an inverter 78 to the preset enable input 80 on the user code shift register 30. Such circuitry allows the newly created random code to be stored into the memory location determined by the user number address code 32 applied to the memory address input 82. This particular arrangement permits the logic to distinguish from insertion and extraction of the card by allowing the random access memory 37 to be preset to the data input 84. This, in turn, causes the code comparison nand gate 44 to switch high. This happens because shift register code 30 will be different from that of the random access memory 37.

When the card is withdrawn to the strobe only position both the memory 37 and code shift register 30 are finally preset. Thus, the continually changing output of the random number generator 35 which has been passing through the random access memory 37 to the user code register 30 is stored as a fixed code at this point. The information passing through memory 37 as indicated at 40 as $Q_0$, $Q_1$, $Q_2$ and $Q_3$ is reversed as an input into register 30. Thus, the code will be applied serially through lead 41 to write head 25. The information printed on the magnetic track is in reverse order because it is being coded as the card is removed. As the card is extracted the strobe line 56 level goes high ("0" as previously defined for this line). Then the output data is shifted out of the shift register to the previously described tape head 25 through its driving circuitry 24. Therefore, as the card is withdrawn the tape head 25 rewrites a new magnetic code on magnetic track 8.

The above description and accompanying drawings are illustrative only. It will be obvious that the card could be embossed with magnetic tracks only. Additionally, such tracks would not necessarily be physically separated on the card. Further, equivalent individual components of the control system could be substituted without departing from the basic invention. Accordingly, the invention is to be limited only by the scope of the following claims.

I claim:

1. A key system comprising
a dielectric card,
a plurality of optical tracks embossed on one face of said card, said tracks being individually coded for digital readout,
at least one magnetic track embossed on said one face of said card, said magnetic track being coded for digital readout,
a receptacle having a slot therein for receipt of said card,
a plurality of optical reading means in said receptacle equal in number to said optical tracks, said optical devices arranged so as to produce outputs indicative of said optical tracks as said card is inserted in said slot, a magnetic reading means in said receptacle arranged so as to produce pulse outputs indicative of said magnetic track, a memory storage device, means for comparing the output of said optical and magnetic reading means with the data in said storage device, means for actuating at least one device in response to said comparison, magnetic write head means in said receptacle arranged so as to change the code on said magnetic track when said card is removed from slot, and random number generating means coupled to said magnetic write head and said memory storage device for supplying said changed code.

2. The system of claim 1 further comprising a metallic non-magnetic backing on said card.

3. The system of claim further comprising a non-magnetic metallic flexible dielectric film secured to one edge of said card.

4. The system of claim 1 wherein said magnetic reading means comprises a Hall-effect magnetic input device.

5. The system of claim 1 wherein said magnetic write head means comprises a magnetic write head, and a pulse forming circuit for producing positive and negative magnetic fields on said magnetic track in response to the output of said random number generating means.

6. A key system comprising a dielectric card, a plurality of tracks embossed on one face of said card, said tracks being coded for digital readout, a receptacle for receipt of said card, a plurality of reading means in said receptacle equal in number to said tracks, said reading means arranged so as to produce pulse outputs indicative of the coding on said tracks, a memory storage device, means for comparing the output of said reading means with the data in said storage device, means for actuating at least one device in response to said comparison, at least one write head means in said receptacle arranged so as to change the code on at least one of said tracks when said card is removed from said receptacle, and random number generating means coupled to said write head means and said memory storage device for supplying said changed code.

7. The system of claim 6 wherein said receptacle contains a slot for insertion of said card whereby said codes on each of said tracks are read serially.

8. The system of claim 6 wherein at least one of said tracks is a magnetic track and said write head means is a magnetic write head.

* * * * *